(12) United States Patent
Aradachi et al.

(10) Patent No.: US 7,969,116 B2
(45) Date of Patent: Jun. 28, 2011

(54) POWER PACK AND CORDLESS POWER TOOL HAVING THE SAME

(75) Inventors: Takao Aradachi, Hitachinaka (JP);
Nobuhiro Takano, Hitachinaka (JP);
Tomomasa Nishikawa, Hitachinaka (JP); Hiroyuki Hanawa, Hitachinaka (JP); Masayuki Ogura, Hitachinaka (JP); Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 326 days.

(21) Appl. No.: 11/396,681

(22) Filed: Apr. 4, 2006

(65) Prior Publication Data
US 2006/0222930 A1 Oct. 5, 2006

(30) Foreign Application Priority Data

Apr. 4, 2005 (JP) ................. P2005-107059
Apr. 6, 2005 (JP) ................. P2005-110351

(51) Int. Cl.
*H02J 7/00* (2006.01)
(52) U.S. Cl. ........................ 320/114; 320/112
(58) Field of Classification Search ........... 320/112–114
See application file for complete search history.

(56) References Cited

U.S. PATENT DOCUMENTS

| 3,734,207 | A | * | 5/1973 | Fishbein | 173/217 |
|---|---|---|---|---|---|
| 5,289,047 | A | * | 2/1994 | Broghammer | 307/125 |
| 5,581,170 | A | * | 12/1996 | Mammano et al. | 320/116 |
| 5,799,739 | A | * | 9/1998 | Takaada et al. | 173/217 |
| 5,903,423 | A | * | 5/1999 | Okano et al. | 361/103 |
| 6,007,939 | A | * | 12/1999 | Clowers | 429/99 |
| 6,075,341 | A | * | 6/2000 | White et al. | 320/114 |
| 6,455,186 | B1 | * | 9/2002 | Moores et al. | 429/71 |
| 6,566,843 | B2 | * | 5/2003 | Takano et al. | 320/114 |
| 6,661,148 | B2 | | 12/2003 | Oomori et al. | |
| 6,722,771 | B1 | * | 4/2004 | Stephens | 362/184 |
| 7,056,616 | B2 | | 6/2006 | Moores, Jr. et al. | |
| 7,095,235 | B2 | | 8/2006 | Fiebig | |
| 7,102,684 | B1 | * | 9/2006 | Higuchi et al. | 348/372 |
| 7,121,362 | B2 | * | 10/2006 | Hsu et al. | 173/217 |
| 7,345,450 | B2 | * | 3/2008 | Krieger et al. | 320/104 |
| 2003/0096158 | A1 | | 5/2003 | Takano et al. | |
| 2003/0096160 | A1 | * | 5/2003 | Sugiura et al. | 429/120 |
| 2003/0151393 | A1 | * | 8/2003 | Takano | 320/150 |
| 2005/0134227 | A1 | * | 6/2005 | Wozniak | 320/134 |
| 2005/0157489 | A1 | * | 7/2005 | Oomori et al. | 362/119 |

FOREIGN PATENT DOCUMENTS

| CN | 1380732 | 11/2002 |
|---|---|---|
| DE | 102 14 364 | 10/2003 |
| JP | 4-75430 | 3/1992 |
| JP | 9-123073 | 5/1997 |

(Continued)

*Primary Examiner* — Melissa J Koval
*Assistant Examiner* — Samuel Berhanu
(74) *Attorney, Agent, or Firm* — Antonelli, Terry, Stout & Kraus, LLP.

(57) ABSTRACT

A compact battery pack with high handling ability and restraining degradation of battery cells. The battery pack includes an insertion portion to be inserted into a handle portion of a cordless power tool and an accommodation portion in which all battery cells are accommodatable. A protection board with a protection circuit that protects batteries against overcharge and over-discharge is installed in the insertion portion. A switching element is connected between the battery cells and a drive motor of the power tool. An air passage in communication with the battery pack is formed within the handle and a main housing of the cordless power tool. The switching element is positioned at the air passage.

41 Claims, 9 Drawing Sheets

FOREIGN PATENT DOCUMENTS

| | | |
|---|---|---|
| JP | 11-055866 | 2/1999 |
| JP | 11-288744 | 10/1999 |
| JP | 2000-012107 | 1/2000 |
| JP | 2002-223525 | 8/2002 |
| JP | 2002-254337 | 9/2002 |
| JP | 2003-164066 | 6/2003 |
| JP | 2005-74613 | 3/2005 |
| JP | 2005-78837 | 3/2006 |

* cited by examiner

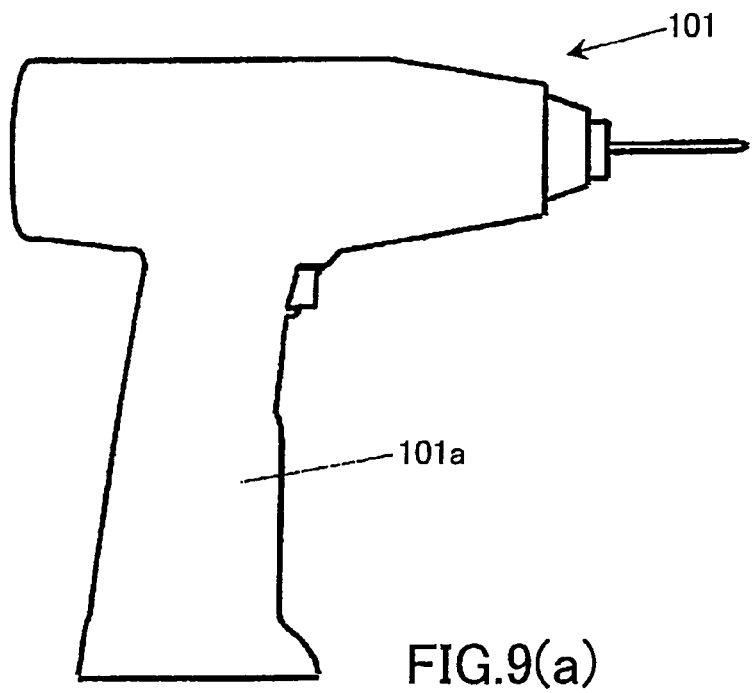
FIG.9(a)
RELATED ART
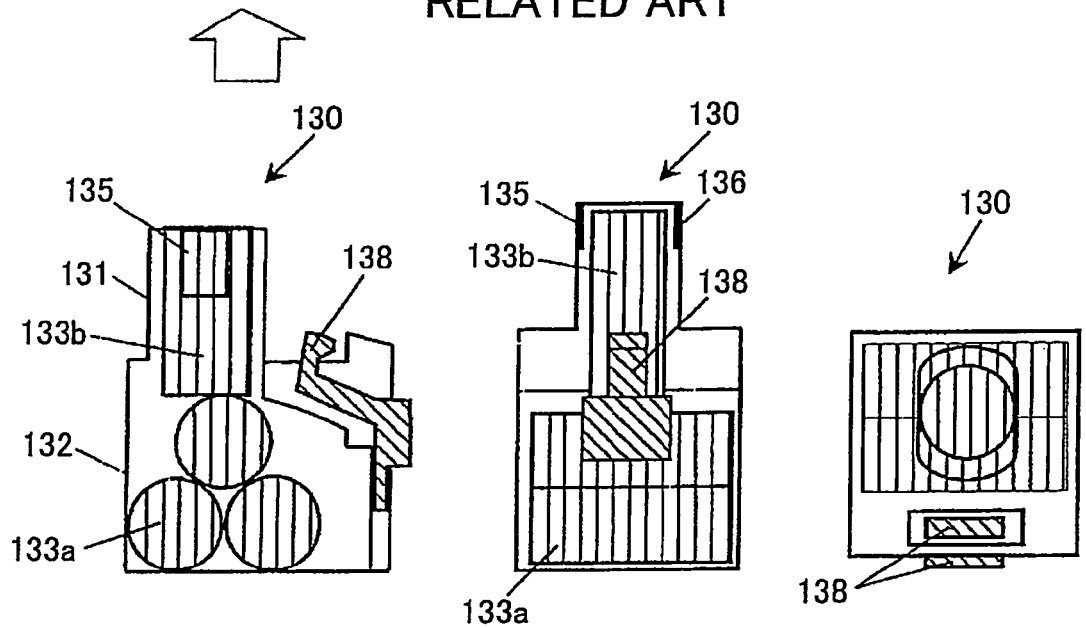
FIG.9(b)
RELATED ART
FIG.9(c)
RELATED ART
FIG.9(d)
RELATED ART

POWER PACK AND CORDLESS POWER TOOL HAVING THE SAME

BACKGROUND OF THE INVENTION

The present invention relates to a battery pack for a cordless power tool, and more particularly, to a battery pack that stores rechargeable or secondary lithium battery cells. The present invention also relates to a cordless power tool having the battery pack.

In a cordless power tool such as a driver, a drill, and an impact tool, rotation of a motor is decelerated by a deceleration mechanism, and the decelerated rotation is transmitted to an end tool. Conventionally, a commercial power source (alternating current source) is used as a power source to the motor. However recently, rechargeable alkaline batteries such as nickel-cadmium battery cells and nickel hydride battery cells are used as a power source of a cordless power tool.

In accordance with an increase in a required voltage in the cordless power tool, the number of battery cells to be accommodated in a battery pack is increased. For example, since a nominal voltage of nickel-cadmium battery cell is 1.2V, 12 battery cells must be accommodated in the battery pack if the required voltage is 14.4V, and 20 battery cells must be accommodated in the battery pack if the required voltage is 24V, and the battery pack must be attached to a cordless power tool. Therefore, in accordance with an increase in required voltage, entire weight of the power tool is increased.

On the other hand, an organic electrolyte rechargeable battery such as a lithium battery cell and lithium ion battery cell provides a higher nominal voltage. Therefore, the number of the battery cells can be reduced. As a result, a compact cordless power tool can be provided.

Here, the lithium battery cell is a generic term over a vanadium-lithium battery and a manganese-lithium battery, and has a negative electrode made from a lithium-aluminum alloy employing organic electrolyte. Further, the lithium ion battery cell has a positive electrode formed of cobaltate lithium and a negative electrode formed of graphite employing organic electrolyte. Throughout the specification, organic electrolyte rechargeable battery such as the lithium battery cell and the lithium ion battery cell will be simply referred to as "lithium battery cell".

The lithium battery cell provides high nominal voltage, for example, 3.6V equivalent to three nickel-cadmium battery cells. That is, the number of battery cells can be reduced by employing lithium battery cells. This is advantageous in terms of a demand of an increase in capacity, and reduction in size and weight. However, degradation of lithium battery cell occurs if excessive charging and/or excessive discharging is performed, or if excessive electric current flows through the lithium battery cell. As a result a service life of the lithium battery cell will be reduced. Further, gas may be generated due to the decomposition of the electrolyte if excessive charging is performed. Moreover, degradation of characteristic occurs due to excessive discharging, which in turn causes electrical short-circuit in the battery cell upon subsequent charging.

To avoid this problem, Japanese Patent Application Publication No. 2003-164066 discloses a protection circuit and control process for protecting the battery cells. The circuit includes a switching element such as a field effect transistor (FET) connected between the battery pack and a DC motor. For the protection, the switching element is shut off prior to the excessive discharging. Relevant technique is also described in Japanese Patent Application Kokai Nos. H11-55866, H04-75430, 2002-223525, and 2000-12107.

SUMMARY OF THE INVENTION

However, a new drawback will be found by the present inventors if FET is disposed at an electrical current path between the battery cell group and the DC motor. That is, conventionally, electrical current level flowing through a personal computer and a cellular phone is quite low by the employment of the lithium battery cell. In contrast, relatively high current level flows through a cordless power tool. For example, a current level of 30 A ordinarily flows through the DC motor of the power tool. If the switching element such as FET is disposed at the current path for avoiding excessive discharging and for protection against the excessive current flow, heat generation in FET will occur. Particularly, if the end tool bites or digs into a workpiece during operation, motor locking occurs so that excessive load current flows through the motor. This load current is also applied to the FET so that overheating in FET will occur.

If breakdown such as electrical short circuit between a source and a drain occurs in FET due to the overheating, FET does not work any more, and the lithium battery cell may be severely degraded due to the excessive discharging or excessive current flowing.

It is therefore, an object of the present invention is to provide a cordless power tool capable of avoiding overheating to a switching element, thereby avoiding degradation of the lithium battery cells.

Another object of the present invention is to provide a compact battery pack capable of avoiding degradation of the lithium battery cells stored therein with high handling ability.

These and other objects of the present invention will be attained by a cordless power tool including a main housing, a handle portion, a DC motor, a fan, a battery pack, and a switching element. The main housing has an internal housing space. The handle portion extends from the main housing and has an internal handle space in communication with the housing space. The DC motor is disposed in the housing space. The fan is disposed in the housing space and is rotatable by the DC motor. The battery pack is assembleable in a free end portion of the handle portion. At least one rechargeable battery cell is accommodatable in the battery pack. An air passage is defined from the battery pack to the housing space through the handle space. An air flow is produced in the air passage upon rotation of the fan. The switching element is connected between the at least one rechargeable battery cell and the DC motor and is positioned at the air passage.

In another aspect of the invention, there is provided a cordless power tool including the main housing, the handle portion, the DC motor, the fan, and a battery pack. The battery pack includes an accommodation portion, an insertion portion, and a switching element. The accommodation portion is adapted for accommodating therein at least one battery cell and is formed with a vent hole for fluid communication between an atmosphere and an internal space of the accommodation portion. The insertion portion extends from the accommodation portion and is attachable to a free end portion of the handle portion. The insertion portion is in fluid communication with the accommodation portion and is formed with a vent hole for fluid communication between the insertion portion and the handle space to define an air passage in an inside of the battery pack. The switching element is connected between the at least one rechargeable battery cell and the DC motor and is positioned at the air passage in the battery pack.

In still another aspect of the invention, there is provided a battery pack accommodating therein a plurality of battery cells and to be assembled into a power tool provided with a portion having an internal space, the battery pack including an insertion portion, an accommodation portion, and a protection board. The insertion portion is insertable into the internal space. The accommodation portion is connected to the insertion portion and is disposed outside of the power tool when the insertion portion is inserted into the internal space. All battery cells are accommodatable into the accommodation portion. The protection board has a protection circuit. At least a part of the protection board is located in the insertion portion.

BRIEF DESCRIPTION OF THE DRAWINGS

In the drawings;

FIG. 9(a) is a side view of a power tool to which a battery pack according to another related art will be assembled;

FIG. 9(b) is a cross-sectional side view of the battery pack according to the other related art;

FIG. 9(c) is a front view of the battery pack according to the other related art; and FIG. 9(d) is a plan view of the battery pack according to the other related art.

DETAILED DESCRIPTION OF THE PREFERRED EMBODIMENTS

Figure 1:
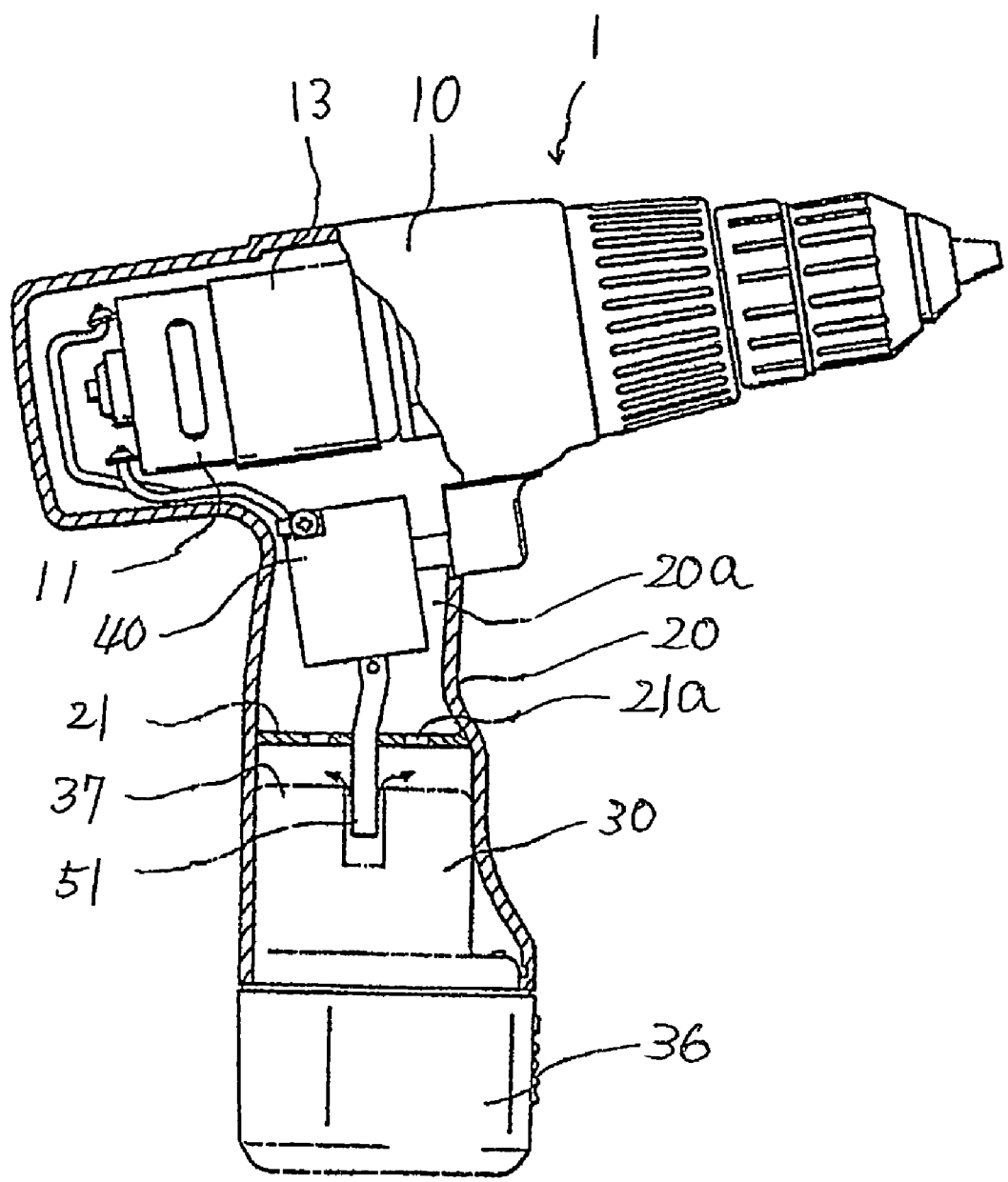
FIG. 1 is a schematic side view partially cut away of an electric power tool according to a first embodiment of the present invention.

A cordless power tool having a battery pack according to a first embodiment of the present invention will be described with reference to FIGS. 1 through 5. A portable fastener driver, a drilling machine, an impact drilling machine and a power wrench are examples of a cordless power tool. The power tool 1 includes a main barrel portion or a housing 10 and a handle portion 20 extending therefrom. The housing 10 has an internal housing space, and the handle portion 20 has an internal handle space in communication with the housing space.

A battery pack 30 accommodating therein a group 31 of lithium battery cells including lithium battery cells 32 through 35 is attachable to a free end portion of the handle portion 20. The housing 10 is formed with a plurality of vent holes 10a at diametrically opposite sides thereof as shown in FIG. 2.

Within the housing 10, a DC motor 11 serving as a drive source is provided. The DC motor 11 has a motor housing 12 formed with vent holes 12a at diametrically opposite sides and generally in alignment with the vent holes 10a. An end bit (not shown) such as a drill bit is positioned at a front end of the housing 10. Further, a deceleration mechanism 13 is housed in the housing 10 for decelerating the rotation speed of the DC motor 11. In case of an impact driver, an impact mechanism (not shown) including a hammer is provided between the deceleration mechanism 13 and the end bit.

Figure 2:
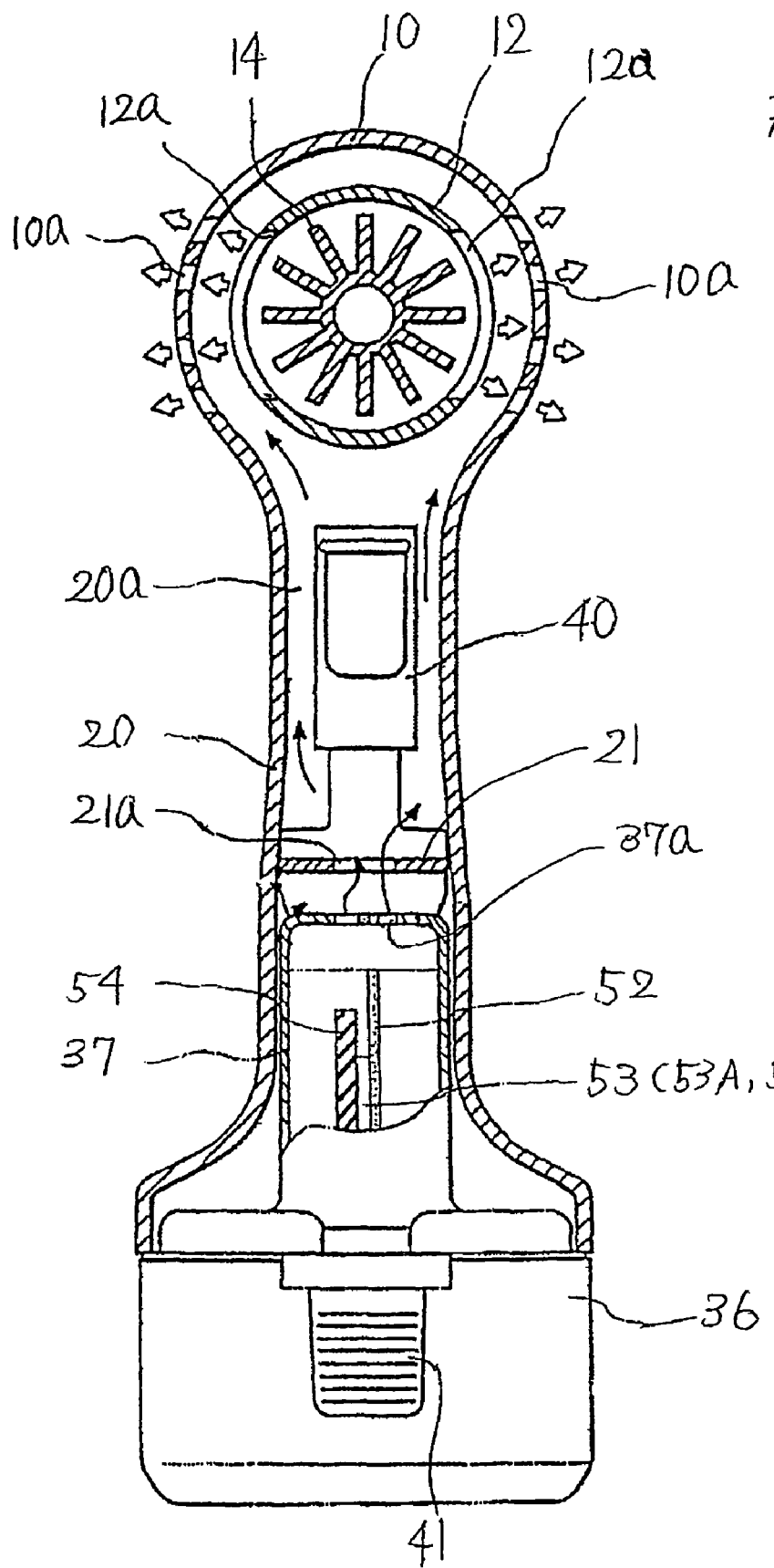
FIG. 2 is a cross-sectional front view of a handle portion and a main body portion of the power tool according to the first embodiment.

A fan 14 is connected to the rotation shaft of the DC motor 11 to cause a positive air flow within the housing 10 and a suction flow within the battery pack 30 and the handle portion 20 as shown by arrows in FIG. 2.

A switch 40 is disposed in the handle portion 20. The switch 40 is electrically connected to the DC motor 11. A partition plate 21 formed with a vent hole 21a is provided in the handle portion 20. The partition plate 21 partitions the interior handle space into a switch accommodation space and a battery pack attachment space. A lead terminal 51 extends through the partition plate 21 for electrically connecting the battery pack 30 to the switch 40. The attachment space is provided with an engagement portion (not shown) to be engaged with the battery pack 30. In the handle portion 20, air passages are defined that fluidly connects an interior of the battery pack 30 to the interior of the housing 10.

The battery pack 30 includes a battery cell accommodation portion 36 for accommodating therein the battery cell group 31, and a cylindrical attachment portion or insertion portion 37 to be inserted into the attachment space of the handle portion 20 and engageable with the engagement portion. A plurality of lithium battery cells 32-35 each having nominal voltage of 3.6V are accommodatable into the accommodation portion 36. If the power tool is operated under the voltage of 14.4V, four battery cells are connected in series as a battery cell group 31.

Figure 3:
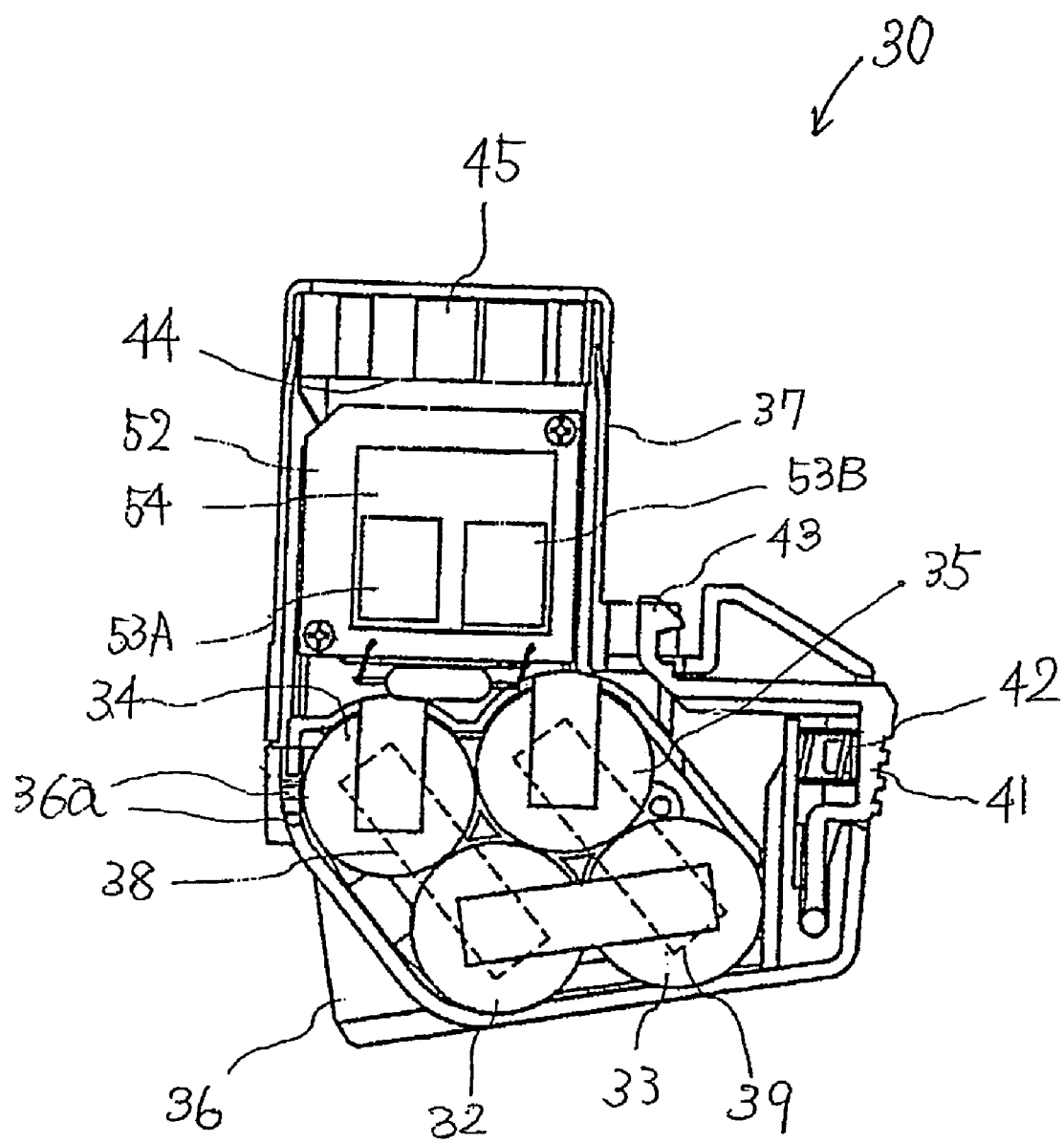
FIG. 3 is a cross-sectional view of the battery pack in the power tool according to first embodiment.

As shown in FIG. 3, in the battery pack 30, the battery cells 32-35 are connected one after another by connection pieces 38, 39. Driving voltage of the power tool is 14.4V, so that four lithium battery cells are connected in series. As a modification, in order to increase electric current capacity, two battery cell groups are connected in parallel, each group having four battery cells connected in series.

The accommodation portion 36 has a front portion (end tool side of the power tool) provided with an operation segment 41 biased by a spring 42. A hook 43 is provided integrally with the operation segment 41. Upon pushing the operation segment 41 against the biasing force of the spring 42, the hook 43 is engageable with the engagement portion (not shown) of the handle portion 20. As shown in FIG. 2, a width of an upper portion of the accommodation portion 36 is greater than that of the attachment portion 37, so that the upper portion of the accommodation portion 36 can be easily formed with vent holes 36a in order to introduce air into the accommodation portion 36.

For example, the accommodation portion 36 has a rear wall portion formed with the vent holes 36a for fluid communication between an atmosphere and an interior of the accommodation portion 36. In order to avoid entry of the dust and foreign objects into the accommodation portion 36 through the vent holes 36*a*, the vent holes 36*a* are covered with a filter (not shown).

The attachment portion 37 has an upper end portion provided with a terminal holding portion 44 whose surface is formed with a terminal 45. Direct current from the lithium battery cells 32-35 is supplied to the DC motor 11 through the terminal 45, the lead terminal 51 and the switch 40.

A circuit board 52 on which FETs 53A, 53B are mounted is provided in the attachment portion 37. In the circuit diagram shown in FIG. 4, a single FET 53 is shown as a switching element for simplicity. However, in the embodiment shown in FIG. 3, two FETs 53*a* 53*b* are connected in parallel in order to increase electric current capacity.

As shown in FIG. 2, a heat sink 54 is mounted directly onto the FET 53 in order to accelerate heat radiation from the FET 53. As shown in FIG. 2, the attachment portion 37 has an upper wall formed with vent holes 37*a*. Air in the cell accommodation portion 36 passes through the vent holes 37*a* and 21*a* and is introduced into the interior of the housing 10 through the air passage 20*a* provided in the handle portion 20. Thus, the circuit board 52 is positioned at the air flow passage.

As described above, DC voltage from the battery pack 30 is supplied to the DC motor 11 through the switching element (FET) 53, lead terminal 51, and switch 40. If the lithium battery cell voltage becomes not more than a predetermined voltage, the switching element 53 is controlled to be rendered OFF in order to avoid excessive discharging. Similarly, if excessive current flows through the DC motor 11, the switching element 53 is controlled to be rendered OFF. Excessive discharging of the battery cell group 31 is avoidable by ON/OFF control to the FET 53 in accordance with a battery voltage. To this effect, motor driving current must be continuously flowed through the FET 53 during discharging phase of the battery pack 30. Here, the current level flowing through the DC motor 11 is as large as 30 A. If such high level current is flowed through the FET 53 for a long period of time, excessive heat generation occurs in the FET 53. Thus, in the present embodiment, the FET 53 is positioned at the air flow passage.

Next, an electrical circuit and control process for avoiding over-discharge of the battery cell group 31 will be described. The circuit is basically the same as that described in Japanese Patent Application Publication No. 2003-164066.

Figure 4:
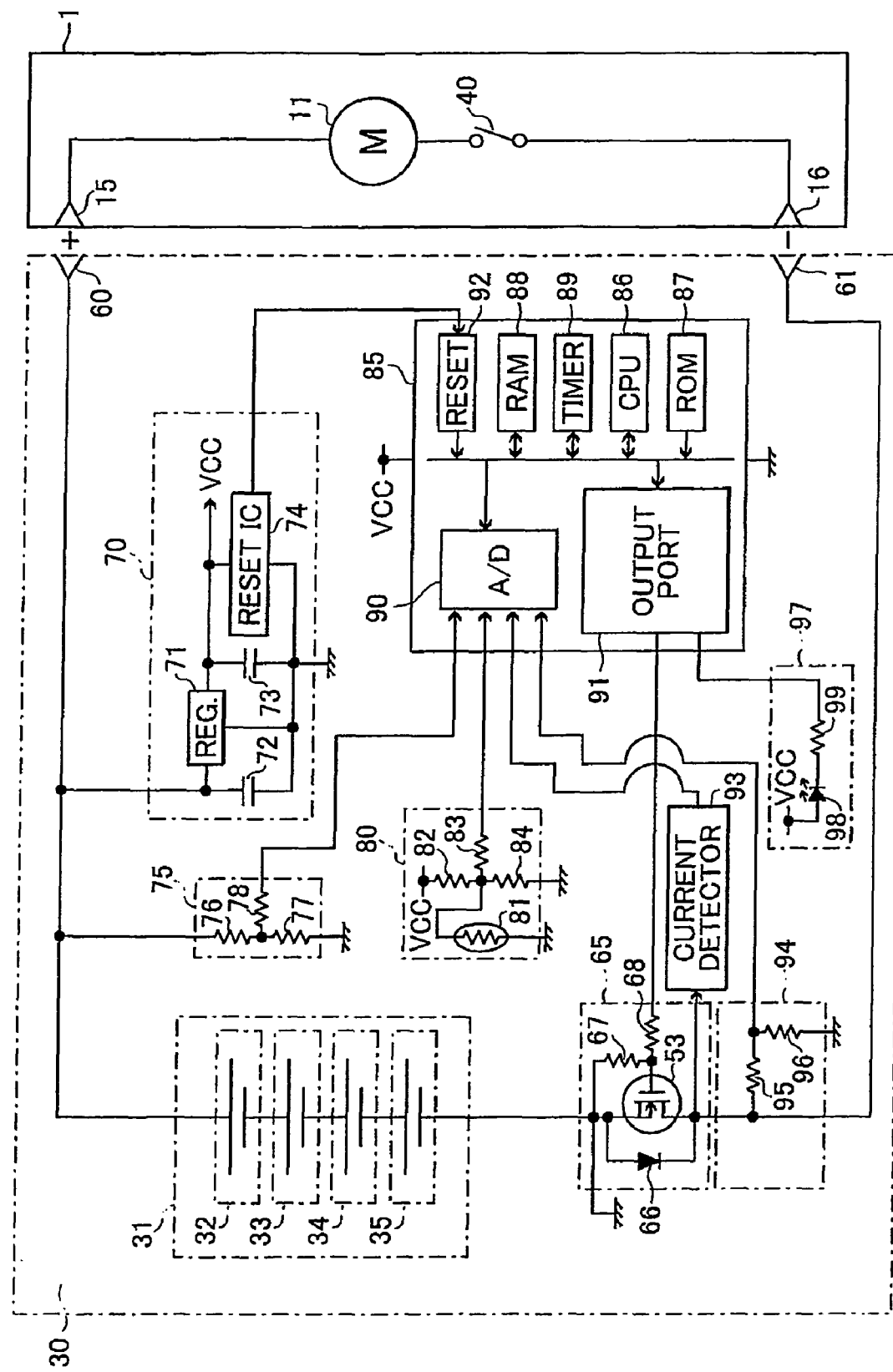
FIG. 4 is a circuit diagram showing an electrical connection between the battery pack and a motor in the power tool according to the first embodiment.

FIG. 4 is a circuit diagram showing the battery pack 30 connected to the handle portion 20 of the power tool 1. The battery pack 30 has a positive terminal 60 and a negative terminal 61. The positive terminal 60 is connected to a positive terminal 15 of the power tool 1 and the negative terminal 61 is connected to a negative terminal 16 of the power tool 1. The DC motor 11 and the switch 40 are connected in series between the positive terminal 15 and the negative terminal 16 of the power tool 1.

The battery pack 30 includes the battery cell group 31, a switching portion 65, a constant voltage power source 70, a battery voltage detector 75, a battery temperature detector 80, a microcomputer 85, a current detector 93, a trigger detector 94, and a display 97. When the switch 40 of the power tool 1 is turned on while the battery pack 30 is connected to the power tool 1, a discharge current flows from the positive terminal of the battery cell group 31 through the power tool 1 to the negative terminal of the battery cell group 31. The battery voltage detector 75, the constant voltage power source 70, the trigger detector 94, and the switching portion 65 are connected to the discharge current path, and the microcomputer 85 is connected to these and other components contained in the battery pack 30.

The microcomputer 85 includes a central processing unit (CPU) 86, a read-only memory (ROM) 87, a random access memory (RAM) 88, a timer 89, an analog-to-digital (A/D) converter 90, an output port 91, and a reset input port 92. The components of the microcomputer 85 are connected to each other through an internal bus.

The switching portion 65 is connected between the negative terminal of the battery cell group 31 and the negative terminal 61 of the battery pack 30, and includes the field-effect transistor (FET) 53, a diode 66, and resistors 67, 68. A control signal from the output port 91 of the microcomputer 85 is applied to the gate of the FET 53 via the resistor 68 to perform switching control for the load current flowing through the power tool 1. The diode 66 connected across the source and drain of the FET 53 serves as a charge current path in which a charge current flows while the battery cell group 31 is being charged with a battery charger (not shown) connected to the battery pack 30.

The current detector 93 serves to judge whether the battery cell group 31 is being charged, discharging, or in other conditions, such as when no load is being placed on the battery cell group 31. The input of the current detector 93 is connected to the cathode of the diode 66 and to the drain of the FET 53. The output of the current detector 93 is connected to the A/D converter 90 of the microcomputer 85.

Although not shown, the current detector 93 includes an inverting amplifier circuit and a non-inverting amplifier connected in parallel which selectively amplify the voltage applied to the current detector 93. The polarity of the voltage applied to the current detector 93 is determined depending on the direction of current, that is, whether a charge current flowing in the diode 66 or a discharge current flowing in the FET 53. The level of the voltage applied to the current detector 93 is determined depending on an ON resistance of the FET 53 and an ON voltage of the diode 66. As a result, an output is generated by either the inverting amplifier circuit or the non-inverting amplifier circuit depending on whether the battery cell group 31 is being charged or discharged. The output from the current detector 93 is subject to A/D conversion by the A/D converter 90 of the microcomputer 85. If it is desired to accurately detect the current value during charge and discharge, then a low-resistance current detecting resistor can be disposed in the loop followed by the current. In this case, the voltage developed according to the level of the current flowing through the resistor can be amplified by an operational amplifier. The A/D converter 90 performs an A/D conversion on the output from the operation amplifier and the current value is calculated based on the resultant digital output.

The constant voltage power source 70 includes a three-terminal regulator (REG.) 71, smoothing capacitors 72, 73, and a reset IC 74. The constant voltage $V_{cc}$ output from the constant voltage power source 70 serves as the power source for the battery temperature detector 80, the microcomputer 85, the current detector 93, and the display 97. The reset IC 74 is connected to the reset input port 92 of the microcomputer 85 and outputs a reset signal to the reset input port 92 in order to initialize settings in the microcomputer 85.

The battery voltage detector 75 is provided for detecting a voltage of the battery cell group 31 and includes resistors 76 to 78. The resistors 76, 77 are connected in series between the positive terminal of the battery cell group 31 and ground. The A/D converter 90 of the microcomputer 85 is connected, through the resistor 78, to the connection point where the resistors 76, 77 are connected together, and outputs a digital value that corresponds to the detected battery voltage. The CPU 86 of the microcomputer 85 compares the digital value from the A/D converter 90 with first and second predetermined voltages to be described later. The first and second predetermined voltages are stored in the ROM 87 of the microcomputer 85.

The battery temperature detector 80 is located adjacent to the battery cell group 31 to detect temperature of the battery cell group 31. The temperature detected by the battery temperature detector 80 is not the temperature of the battery cell group 31 in a strict sense but is substantially equal to the temperature of the battery cell group 31. The battery temperature detector 80 includes a thermistor 81 and resistors 82 to 84. The thermistor 81 is connected to the A/D converter 90 of the microcomputer 85 through the resistor 83. Accordingly, the A/D converter 90 outputs a digital value that corresponds to the battery temperature detected by the battery temperature detector 80. The CPU 86 of the microcomputer 85 compares the digital value with a predetermined value to judge whether the battery temperature is abnormally high.

The trigger detector 94 includes resistors 95, 96 and detects when the switch 40 of the power tool 1 is turned ON. While the switch 40 is OFF, the voltage of the battery cell group 31 is not applied to the drain of the FET 53. Therefore, the input of the A/D converter 90 connected to the trigger detector 94 is held at ground potential. On the other hand, because the DC resistance of the DC motor 11 is extremely small, for example, only a few ohms, a voltage substantially the same as the battery voltage is developed between the drain and the source of the FET 53 while the switch 40 is ON. This voltage is divided at the resistors 95, 96 and the voltage developed across the resistor 96 is applied to the A/D converter 90 so that the ON condition of the switch 40 can be detected.

The display 97 includes a light emitting diode (LED) 98 and a resistor 99. The LED 98 is controlled to illuminate or turn OFF in accordance with output from the output port 91 of the microcomputer 85. The display 97 is controlled to display, for example, a warning that the temperature of the battery cell group 31 is too high when the battery temperature detector 80 detects a battery temperature that is higher than the predetermined temperature.

Figure 5:
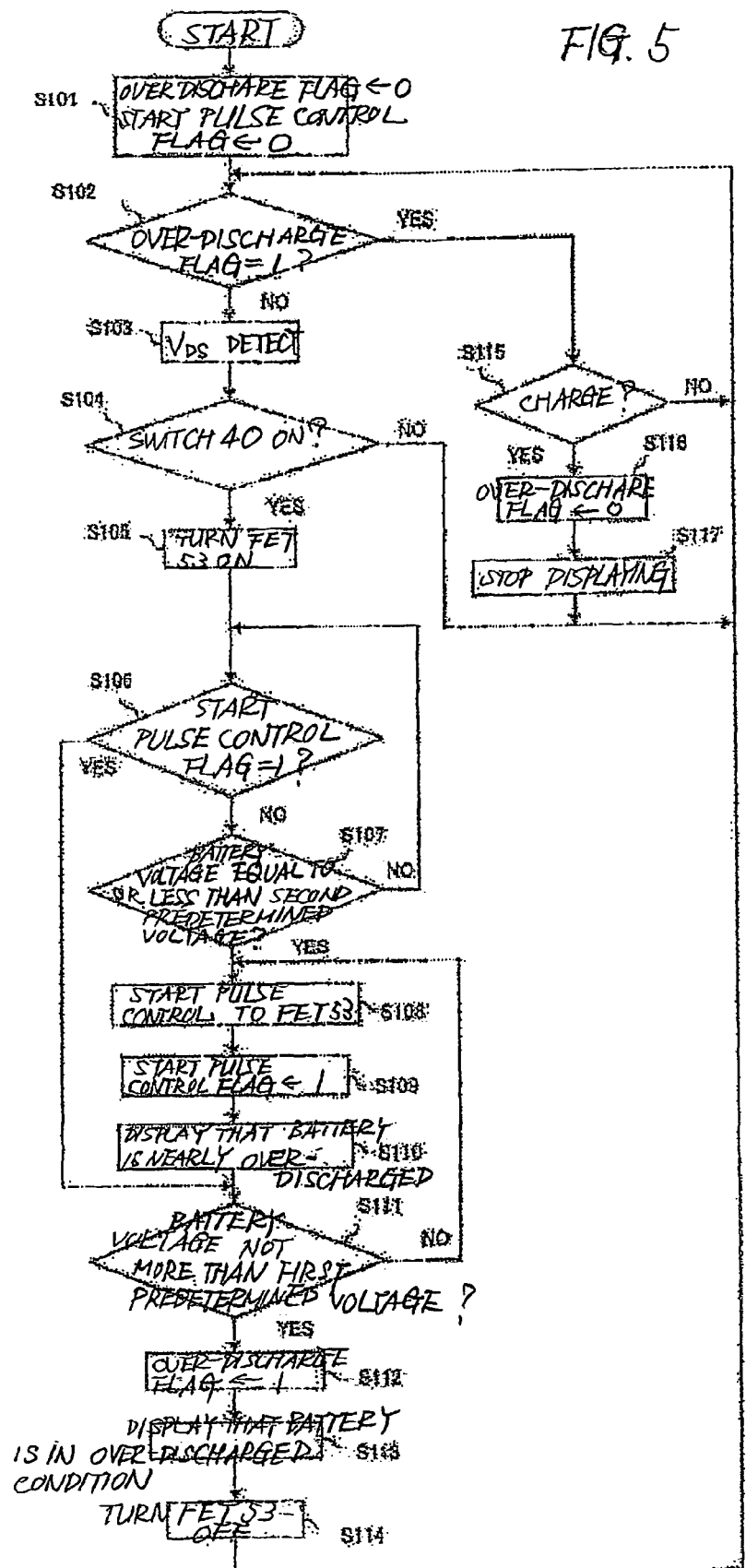
FIG. 5 is a flowchart showing a control processing in the battery pack assembled in the power tool according to the first embodiment.

Next, control process for avoiding excessive discharge of the battery cell group 31 will be described with reference to the circuit diagram of FIG. 4 and the flowchart of FIG. 5. A control program is stored in the ROM 87 of the microcomputer 85 and is executed by the CPU 86.

First, in S101 the microcomputer 85 initializes settings at its output port 91 and also initializes to zero its over-discharge flag, and start pulse control flag. The over-discharge flag indicates that the battery cell group 31 is over-discharged. The start pulse control flag indicates that the battery cell group 31 is nearly over-discharged.

In S102, the microcomputer 85 judges whether or not the over-discharge flag is set to one. The over-discharge flag indicates whether or not the battery cell group 31 is over-discharged, and indicates the battery cell group 31 is over-discharged when set to one and not over-discharged when set to zero.

In S101, the over-discharge flag is initially set to zero. If the judgment in S102 falls No, that is, if the over-discharge flag is not one, the routine goes into S103 where the voltage $V_{DS}$ between the drain and source of the FET 53 of the switching portion 65 is detected. Next, in S104 it is judged whether or not the switch 40 of the power tool 1 is ON based on the output from the trigger detector 94. A voltage substantially equal to the battery voltage is developed between the drain and the source of the FET 53 when the switch 40 is turned ON. Therefore, whether or not the switch 40 is turned ON can be detected based on the voltage $V_{DS}$ detected in S103.

When the switch 40 is not turned ON (S104:NO), then the program returns to S102. If the switch 40 is turned ON (S104: YES), then in S105 the FET 53 of the switching portion 65 is turned ON in accordance with output from the output port 91. Then, in S106 it is judged whether or not the start pulse control flag is set to one. If the start pulse control flag is set to one (S106:YES), then the program jumps to the step of S111.

If the start pulse control flag is not set to one (S106:NO), then in S107 it is judged, based on output from the battery voltage detector 75, whether or not the voltage of the battery cell group 31 has reached the second predetermined value or lower. In the present embodiment, whether or not battery voltage is at or lower than the second predetermined value is to know whether or not the battery cell group 31 is near an over-discharged condition. The battery voltage that indicates that the battery cell group 31 is near an over-discharged condition differs depending on the level of the discharge current. In the case of a lithium battery cell having a nominal voltage of 3.6V used in a power tool, a near over-discharged condition can be said when the voltage of a battery cell falls to about 2.5V to 2.7V.

A first predetermined voltage to be described later with respect to process in S111 serves as a reference voltage for judging whether or not the battery cell group 31 has actually reached an over-discharged condition. Accordingly, the first predetermined voltage is lower than the second predetermined voltage. The reference for indicating that the battery cell group 31 has reached an over-discharged condition also differs depending on the level of the discharge current. In the case of the lithium battery cell having nominal voltage of 3.6V used in a power tool, an over-discharged condition can be said when the voltage of the battery cell is about 2.3V to 2.5V. If the battery voltage is more than the second predetermined voltage (S107:NO), discharge is continued.

If it is judged that the voltage of the battery cell group 31 is not more than the second predetermined voltage (S107:YES), then this means that the battery cell group 31 is nearly in an over-discharged condition. Therefore, in S108 a pulse control is started, in accordance with output from the output port 91, to perform switching action of the FET 53 of the switching portion 65 at a predetermined frequency. When the pulse control is started, an average voltage applied to the DC motor 11 drops so that the DC motor 11 rotates at a slower speed. The operator of the power tool 1 can perceive the change in speed of the DC motor 11 and understands that it means that the battery cell group 31 has nearly reached an over-discharged condition.

After the pulse control has started in S108, the start pulse control flag is set to one in S109. Then, in S110 the display 97 is controlled by the output of the output port 91 to display that the battery is nearly over-discharged. The operator of the power tool 1 can view the display 97 to confirm that the reason the DC motor 11 is rotating more slowly is because the battery cell group 31 is nearly used up. Then, in S111, it is judged, based on the output from the battery voltage detector 75, whether or not the voltage across the battery cell group 31 has reached the first predetermined voltage or less. If the voltage across the battery cell group 31 is not at the first predetermined voltage or less (S111:NO), then the program jumps to S108.

If the voltage across the battery cell group 31 is at the first predetermined voltage or less (S111:YES), then it is judged that the battery cell group 31 has entered an over-discharged condition. Therefore, the battery over-discharge flag is set to one in S112 and, in accordance with output from the output port 91, the display 97 is displayed to indicate a battery over-discharge condition in S113. Therefore, the operator recognizes the necessity of charging. Next, the FET 53 of the switching portion 65 is turned OFF in S114, whereupon the program returns to S102.

On the other hand, when it is judged that the over-discharge flag is set to one (S102:YES), then in S115 it is judged whether or not the battery cell group 31 is charged based on the output from the current detector 93. Because the over-discharge flag is set with a value of one as judged in S102, the battery cell group 31 cannot be used until the battery cell group 31 has been charged. Incidentally, charging is performed by removing the battery pack 30 from the power tool 1, and by connecting the battery pack 30 to a battery charger (not shown). The judgment of whether or not the battery cell group 31 is charged is made based on the direction of current flowing through the battery cell group 31. That is, charge current flows from the positive terminal to the negative terminal of the battery cell group 31 through the diode 66. Therefore, whether or not the battery cell group 31 is being charged is judged according to the direction of the current detected by the current detector 93. The program proceeds to S116 once it is judged in S115 that charging has continued for a fixed period of time (S115:YES).

If it is judged that the battery cell group 31 has not yet been fully charged (S115:NO), then the program returns to S102 until charging is completed. Once it is judged that the battery cell group 31 has been completely charged (S115:YES), then in S116 the over-discharge flag is reset to zero and in S117 the display 97 is controlled to stop displaying that the battery cell group 31 is over-discharged, whereupon the program returns to S102.

In this way, if the output from the battery voltage detector 75 becomes not more than the first predetermined voltage so that the decrease in battery capacity is detected, electrical current flowing from the battery cell group 31 to the power tool 1 is shut off. Therefore, by setting the over-discharge voltage of the battery cell group 31 as the first predetermined voltage, over-discharge of the battery cell group 31 can be prevented to provide a prolonged cyclic life of the battery cells.

According to the above-described control process, when the battery voltage is at the second predetermined voltage or less during use of the power tool 1, the switching portion 65 is controlled to compulsorily lower the speed of the DC motor 11 (first control). Further, when the battery voltage is lower than the second predetermined voltage and also equal to or lower than the first predetermined voltage, then the switching portion 65 is controlled to cut off load current supplied to the DC motor 11 (second control).

However, the above-described embodiment may be modified in such a manner that the first control is dispensed with and only the second control is performed. The embodiment may alternatively be modified in such a manner that the second control is dispensed with and only the first control performed.

With the above-described geometrical arrangement within the housing 10 and handle portion 20, upon rotation of the DC motor 11, the fan 14 is rotated so that air flow is generated flowing out of the housing 10 through the vent holes 12a and 10a. The air flow sucks air in the air passage 20a in the handle portion 20 to generate air flow in the handle portion 20 and in the battery pack 30 as shown by arrows in FIG. 2.

Since the FET 53 serving as the switching element is disposed at the air flow passage, effective heat radiation is performed to avoid overheating to the FET 53. Further, since the heat sink 54 is mounted on the FET 53, heat releasing function is further promoted. As a result, short circuit of FET 53 due to overheating can be avoided, so that excessive discharge of the battery cell group 31 can be prevented.

Further, the FET 53 is rendered OFF when excessive current is detected by the current detector 93. In this connection excessive current flowing through the battery cell group 31 due to damage to the FET 53 by overheating can be obviated as long as the trouble of short circuit of FET 53 is eliminated. Thus, excessive current discharge and overheating at the time of excessive current discharge can be avoided in FET 53, thereby avoiding degradation of lithium battery cells.

Figure 6A:
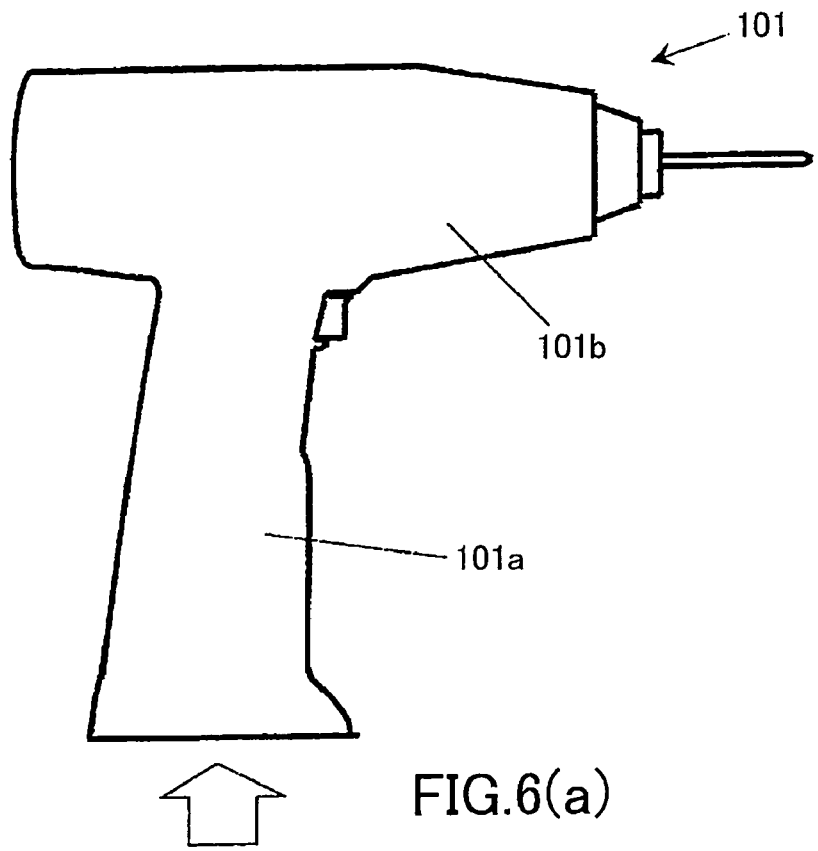
FIG. 6(a) is a side view of a power tool to which a battery pack according to a second embodiment of the present invention will be assembled.
Figure 6B:
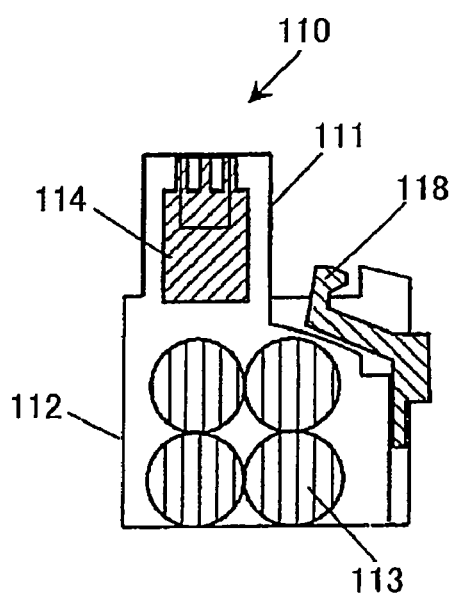
FIG. 6(b) is a cross-sectional side view of the battery pack according to the second embodiment.

Next, a battery pack according to a second embodiment of the present invention will be described with reference to FIGS. 6(a) through 7.

A power tool 101 includes a handle portion 101a and a drive mechanism installing portion 101b in which a motor and a deceleration mechanism connected to a drive shaft of the motor are accommodated. The handle portion 101a defines an internal space in which a battery pack 110 is assembled. The internal space has an engagement region (not shown).

The battery pack 110 includes an insertion portion 111 and an accommodation portion 112 provided integrally with the insertion portion 111. The insertion portion 111 is to be inserted into the internal space of the handle portion 101a and has a configuration in conformance with the shape of the internal space. A protection board 114 having a protection circuit 200 (FIG. 7) is accommodated in the insertion portion 111. The protection circuit 200 is particularly required in case of the employment of lithium battery cell in terms of safety at a time of charging and discharging. That is, degradation and ignition may occur in the lithium ion battery cell as a result of excessive charging and excessive discharging. The protection circuit 200 is required to avoid this problem. An entire protection board 114 is accommodated in the insertion portion 111 in the depicted embodiment. However, a part of the protection board 114 can be accommodated in the insertion portion 111 and a remaining part of the protection board 114 can be accommodated in the accommodation portion 112.

An exclusive IC circuit is available as the protection circuit 200. Alternatively, overcharge or over-discharge can be monitored by a microcomputer. In any event, charging or discharging path in the battery pack 110 is shut off by a shut off unit such as a FET 205 (FIG. 7) provided at the path if a voltage level in lithium ion battery cell is reduced below a predetermined lower limit or exceeds a predetermined upper limit.

Figure 6C:
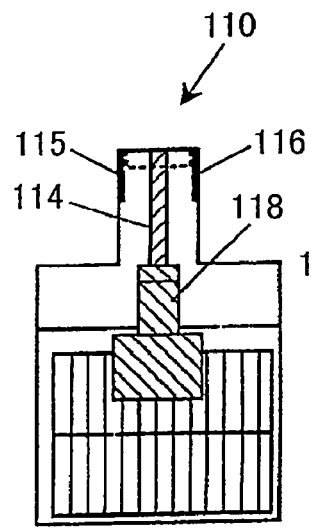
FIG. 6(c) is a front view of the battery pack according to the second embodiment.
Figure 6D:
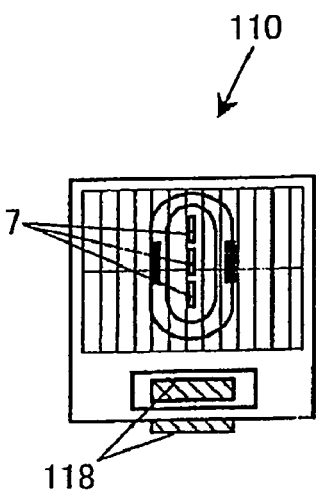
FIG. 6(d) is a plan view of the battery pack according to the second embodiment.
Figure 7:
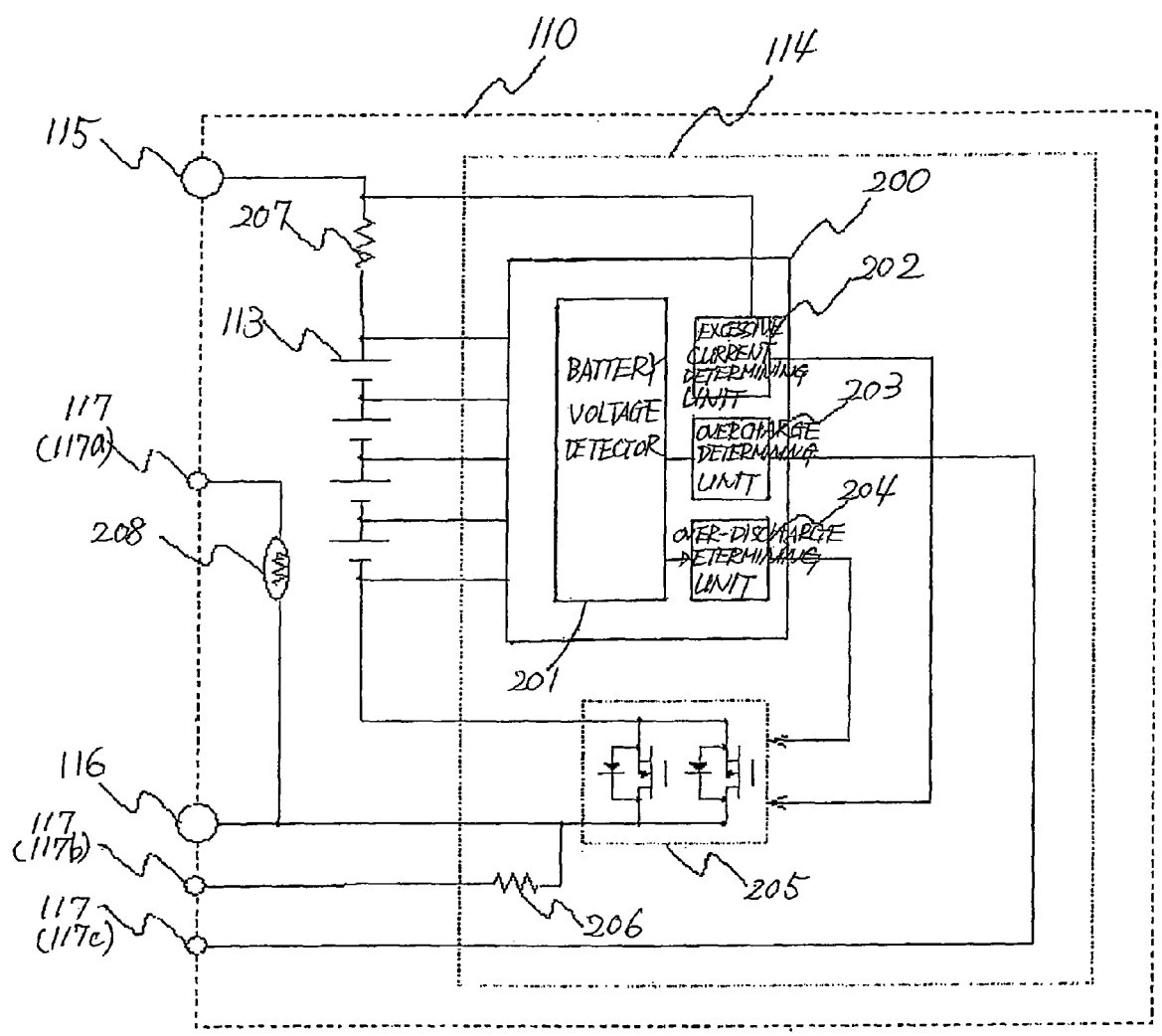
FIG. 7 is a circuit diagram showing an electrical connection in a battery pack according to the second embodiment.
Figure 8A:
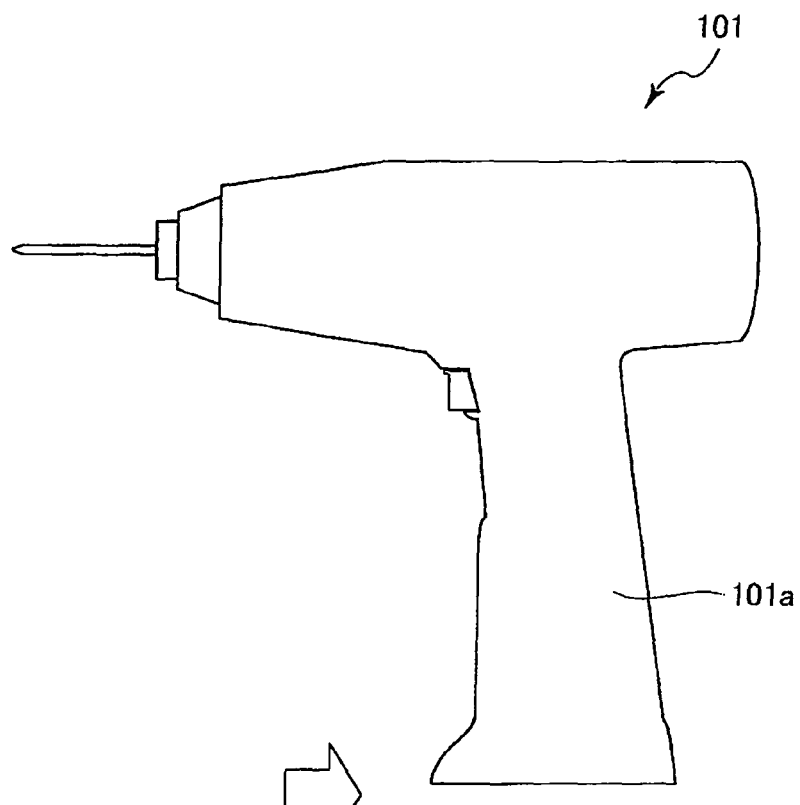
FIG. 8(a) is a side view of a power tool to which a battery pack according to a related art will be assembled.
Figure 8B:
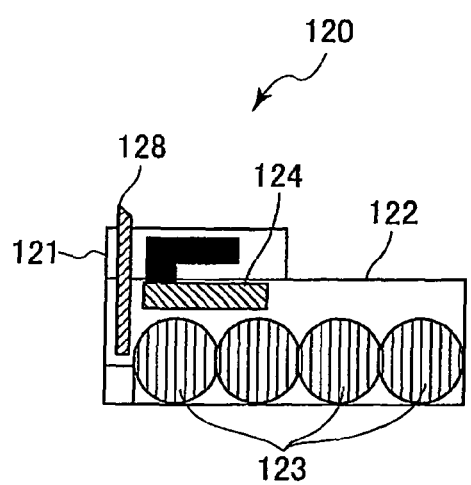
FIG. 8(b) is a cross-sectional side view of the battery pack according to the related art.
Figure 8C:
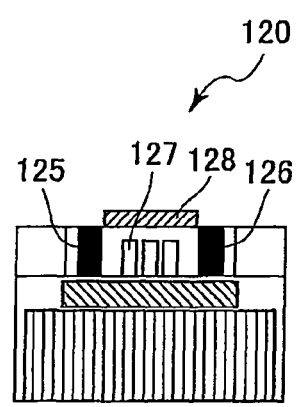
FIG. 8(c) is a front view of the battery pack according to the related art.
Figure 8D:
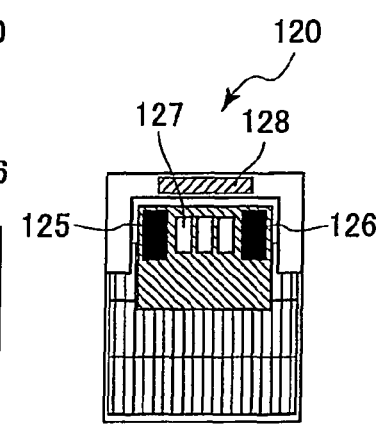
FIG. 8(d) is a plan view of the battery pack according to the related art.

As shown in FIG. 6(c), a positive terminal 115 and a negative terminal 116 are attached at opposing walls of the insertion portion 111. Further, as shown in FIG. 6(d), a battery cell information transmission terminals 117 are exposed to an atmosphere at a top face of the insertion portion 111. The terminals 117 are adapted for transmitting a condition of the battery cell to an external component. The condition of the battery cell includes overcharge, over-discharge, over-current, and temperature of the battery cell.

The accommodation portion 112 protrudes out of the power tool 101 when the insertion portion 111 is inserted into the internal space of the handle portion 101a in a direction indicated by an arrow in FIG. 6(a). All lithium battery cells 113 (four battery cells in the depicted embodiment) are accommodated into the accommodation portion 112. All lithium battery cells 113 are connected in series, and a positive electrode of a leading end battery cell is connected to the positive terminal 115, and a negative electrode of a trailing end battery cell is connected to the negative terminal 116.

The accommodation portion 112 has an upper portion pivotally movably supporting a latch 118 engageable with the engagement region in the internal space of the handle portion 101a when the insertion portion 111 is fully inserted into the internal space. Thus, the battery pack 110 is held by the power tool 101.

Since the lithium battery cells 113 are not accommodated in the insertion portion 111, size of the handle portion 101a of the power tool 101 can be freely determined regardless of a diameter of the lithium battery cell 113. Thus, degree of freedom in a design of the handle portion 101a can be enhanced, and a gripping performance can be a primary attention.

Further, since entire or a part of the protection board 114 is installed in the insertion portion 111 where no battery cell is accommodated, a layout space for the protection board 114 can be reduced in the accommodation portion 112, which is other than the insertion portion 111. As a result, an entire volume of the power tool 101 and the battery pack 110 when the latter is assembled into the power tool 101 can be reduced. Consequently, improved handling ability can result.

Furthermore, since the battery cell information transmission terminals 117 are provided at the insertion portion 111 of the battery pack 110, a plurality of terminals can be aggregatedly disposed at the distal end portion of the insertion portion.

Comparative examples are shown in FIGS. 8(a) through 8(d). FIGS. 8(a) through 8(d) show a first comparative example in which a battery pack 120 is assembled to the power tool 101 with a sliding motion as indicated by an arrow in FIG. 8(a).

The battery pack 120 includes an attachment portion 121 to be attached to a handle portion 101a of the power tool 101, and an accommodation portion 122 integral with the attachment portion 121. The accommodation portion 122 accommodates therein a plurality of lithium battery cells 123 (four battery cells) and a protection board 124 having a protection circuit. A positive terminal 125, a negative terminal 126 and an information transmission terminal 127 are embedded in the attachment portion 121, and a latch 128 protrudes from the upper portion of the attachment portion 121 for preventing the battery pack 120 from being released from the power tool 101.

FIGS. 9(a) through 9(d) show a second comparative example in which a battery pack 130 is assembled to the power tool 101 with inserting motion as indicated by an arrow in FIG. 9(a). The battery pack 130 includes an insertion portion 131 to be inserted into the handle portion 101a and an accommodation portion 132 integral therewith. A three lithium battery cells 133a are accommodated in the accommodation portion 132 whereas one lithium battery cell 133b is accommodated in the insertion portion 131. A positive terminal 135 and a negative terminal 136 are provided at opposite sides of the insertion portion 131.

According to the first comparative example, due to slide-assembly type, only a limited mass of the battery pack 120 is disposed within an internal space of the handle portion 101a, and as a result, almost all portion of the battery pack 120 is positioned outside of the handle portion 101a. Thus, a bulky combined shape of the power tool 101 and the battery pack 120 results when the battery pack 120 is assembled to the power tool 101. In other words, the battery pack 120 cannot utilize the advantage of using compact lithium battery cells.

According to the second comparative example, a greater mass of the battery pack 130 can be inserted into the handle portion 101a in comparison with the first comparative example. However, temperature fluctuation occurs among lithium battery cells 133a and 133b due to separate layout of these battery cells. This temperature fluctuation causes rapid degradation of the battery cells. The degradation due to the temperature variation among battery cells occurs particularly in lithium battery cells rather than in nickel-cadmium battery cells and nickel hydride battery cells.

On the other hand, according to the above described embodiments, lithium battery cells are aggregated only in the accommodation portion 112, temperature fluctuation among battery cells does not easily occur, to avoid degradation of the battery cells. Further, a part of or the entire protection board 114 is disposed in the insertion portion 111. Since the insertion portion 111 does not dispose the battery cells 113 but disposes only the protection board 114, a degree of design freedom on the handle portion can be improved.

Next, electrical circuit in the battery pack 110 will be described with reference to FIG. 7. The circuit includes the protection board 114, the four lithium battery cells 113, the positive terminal 115, the negative terminal 116, the battery cell information transmission terminal 117, the protection circuit 200 and the FET 205 those described above. The protection circuit 200 includes a battery voltage detector 201, an excessive current determining unit 202 connected to the positive terminal 115 and to the FET 205, an over-charge determining unit 203 connected to the battery voltage detector 201, and an over-discharge determining unit 204 connected to the battery voltage detector 201 and to the FET 205. Terminals of each battery cell 113 are connected to the battery voltage detector 201. Each voltage of each battery cell 113 is monitored at the battery voltage detector 201.

The battery cell information transmission terminal 117 includes a battery temperature transmission terminal 117a, a battery kind transmission terminal 117b, and an over-charge transmission terminal 117c. The battery temperature transmission terminal 117a is connected to the FET 205 through a temperature sensing element 208 such as a thermistor. The thermistor 208 is positioned in the vicinity of the battery cells 113 for detecting temperature of the battery cells 113. Further, the battery kind transmission terminal 117b is connected to the FET 205 through a resistor 206. Further, a resistor 207 is connected between the positive terminal 115 and a leading end battery cell of the battery cells 113.

When the tool 101 is continuously operated, voltage of the battery cells 113 is decreased. The battery voltage detector 201 monitors each voltage level of each battery cell 113, so that the monitored signal is input to the over-discharge determining unit 204. If the over-discharge determining unit 204 determines that the voltage of the battery cell 113 becomes not more than an allowable lower limit, the determining unit 204 outputs a shut off signal to the FET 205 to turn off the FET 205 in order to shut off a discharge current path. In the circuit diagram shown in FIG. 7, two FETs are connected in parallel in order to restrain heat generation of the FET. Only a single FET can be used instead.

If the power tool 101 becomes a locking state, high level current flows through the battery cells 113. This current is detected at the current detection resistor 207, so that the excessive current determination unit 202 outputs a shut off signal to the FET 205 to turn off the FET 205.

On the other hand, when the battery pack 110 is connected to the battery charger, the battery voltage detector 201 monitors the voltage level of each battery cell 113. A signal indicative of temperature of the battery cells 113 is input to the battery charger through the battery temperature transmission terminal 117a.

When the voltage of the battery cells 113 is elevated by charging and the voltage level becomes not less than an allowable upper limit, the over-charge determining unit 203 outputs a shut off signal for shutting off the charge current path. Incidentally, an FET for charging control can be provided instead of the FET 205. In the latter case, the FET for the charging control is connected in series in a reverse direction with respect to the FET 205.

While the invention has been described in detail and with reference to specific embodiments thereof, it would be apparent to those skilled in the art that various changes and modifications may be made therein without departing from the spirit and scope of the invention. For example, the number of battery cells is not limited to four, but a desired number of battery cells can be accommodated as long as a configuration of the accommodation portion is modified.

In the embodiment shown in FIG. 3, the vent holes 36*a* are formed at the rear wall of the accommodation portion 36. However, vent holes can be formed at any portion of the accommodation portion 36 such as a front wall thereof beside the operation segment 41.

Further, in the above described embodiment, the switching element is disposed within the battery pack. However, the switching element can be disposed separately from the battery pack. In the latter case, also, the switching element is positioned at the air flow passage.

What is claimed is:

1. A power pack to be assembled into a power tool provided with a portion having an internal space for receiving a part of the power pack having a plurality of battery cells so as to supply electrical power from the power pack to the power tool, the power pack comprising:
    an insertion portion insertable into the internal space through an open end of the portion of the power tool, the insertion portion delimiting an elongated space extending in an elongated direction from the open end of the portion of the power tool, wherein the insertion portion does not accommodate a battery cell therein;
    a terminal holding portion accommodated in a part of the elongated space of the insertion portion which is at a position away from the open end of the portion of the power tool when the insertion portion is inserted into the internal space;
    an accommodation portion having a bottom surface and side walls connected to the insertion portion and disposed outside of the power tool when the insertion portion is inserted into the internal space, the accommodation portion having the plurality of battery cells comprising rechargeable lithium ion battery cells accommodated therein for supplying the electrical power to the power tool, each of the plurality of battery cells having a positive terminal and a negative terminal and a longitudinal axis, wherein all of the plurality of battery cells of the power pack only being accommodated into the accommodation portion so that none of the plurality of battery cells of the power pack is accommodated in the insertion portion, each of the plurality of battery cells of the power pack having the longitudinal axis thereof oriented substantially parallel to the bottom surface of the accommodation portion and in a substantially perpendicular extending direction at least with respect to the elongated extending direction of the elongated space of the insertion portion; and
    an electrical circuit board disposed in the elongated space of the insertion portion at least at a position between the terminal holding portion and the accommodation portion, the electrical circuit board extending in the elongated extending direction of the elongated space, and the electrical circuit board having a circuit which controls a switching element for electrical protection of at least one of the plurality of battery cells, at least a major portion of the circuit board being located in the insertion portion.

2. The power pack as claimed in claim 1, wherein the electrical circuit board in its entirety is located in the insertion portion.

3. The power pack as claimed in claim 1, wherein the insertion portion has a tip end portion, and the power pack further comprising an information transmission terminal provided at the tip end portion for transmitting a condition of the plurality of battery cells.

4. The power pack as claimed in claim 1, wherein the insertion portion is provided integrally with at least part of the accommodation portion.

5. The power pack as claimed in claim 1, wherein the portion of the power tool is a handle portion.

6. The power pack as claimed in claim 1, wherein the circuit controls the switching element so as to turn ON/OFF a current path connected to the power tool.

7. The power pack as claimed in claim 1, wherein the circuit controls the switching element in accordance with a condition of the plurality of battery cells.

8. The power pack as claimed in claim 1, wherein the switching element includes at least one FET.

9. The power pack as claimed in claim 8, wherein the switching element includes two FET connected in parallel.

10. The power pack as claimed in claim 8, further comprising a heat sink which radiates heat generated by the at least one FET.

11. The power pack as claimed in claim 1, wherein the electrical circuit board is disposed within the insertion portion so as to be spaced from a housing of the insertion portion which surrounds the electrical circuit board.

12. The power pack as claimed in claim 1, further comprising an electrical terminal connected with the electrical circuit board and located above the electrical circuit board between the electrical circuit board and an upper surface of a housing of the insertion portion.

13. The power pack as claimed in claim 1, wherein the circuit of the circuit board which controls a switching element for electrical protection includes two FET switches connected in parallel and positioned at an air flow passage of at least the major portion of the circuit board which is located in the insertion portion.

14. The power pack as claimed in claim 1, wherein the insertion portion extends in a longitudinal direction transverse to a direction of extension of the accommodation portion so as to be inserted in a longitudinal extension direction of the portion of the power tool having the internal space therein, at least the major portion of the circuit board which is located in the insertion portion extending in the longitudinal direction of the insertion portion.

15. The power pack as claimed in claim 14, wherein the circuit board is located in the insertion portion so as to be spaced from a housing of the insertion portion to enable air flow around the circuit board.

16. The power pack as claimed in claim 15, wherein the housing of the insertion portion includes vent holes enabling air flow therethrough so as to enable cooling of the circuit of the circuit board.

17. The power pack as claimed in claim 1, wherein the elongated extending direction of the internal space of the insertion portion is a vertical extending direction, the part of the elongated internal space which extends in the vertical direction at which the terminal holding portion is accommodated is an upper part thereof, the substantially perpendicular extending direction of each of the plurality of battery cells of the power pack is a horizontally extending direction, the position of the electrical circuit board between the terminal holding portion and the accommodation portion is a position below the terminal holding portion so that the electrical circuit board extends in the vertical extending direction of the internal space, and wherein the terminology of (a) vertical, (b) upper, (c) horizontally, and (d) below are utilized based upon an orientation of the power tool in which the power tool is located above the power pack when the power pack is assembled into the power tool.

18. The power pack as claimed in claim 1, wherein the terminal holding portion is supported by the circuit board.

19. A combination of a power tool and a power pack comprising:
   the power tool having a motor and a receiving portion;
   the power pack having a plurality of battery cells being assembled into the receiving portion so as to supply electric power from the power pack to the motor;
   the power pack comprising:
   an insertion portion insertable into the receiving portion through an open end of the receiving portion, the insertion portion delimiting an elongated space therein extending in an elongated direction away from the open end of the receiving portion, wherein the insertion portion does not accommodate a battery cell therein;
   a terminal holding portion accommodated in a part of the elongated space which is at a position away from the open end of the receiving portion when the insertion portion is inserted into the receiving portion;
   an accommodation portion having a bottom surface and side walls connected to the insertion portion and disposed outside of the power tool when the insertion portion is inserted into the receiving portion;
   the accommodation portion having the plurality of battery cells comprising rechargeable lithium ion battery cells accommodated therein for supplying the electrical power to the motor, each of the plurality of battery cells having a positive terminal and a negative terminal and a longitudinal axis, wherein all of the plurality of battery cells of the power pack only being accommodated into the accommodation portion so that none of the plurality of battery cells is accommodated in the insertion portion, each of the plurality of battery cells of the power pack having the longitudinal axis thereof oriented substantially parallel to the bottom surface of the accommodation portion and in a substantially perpendicular extending direction at least with respect to the elongated extending direction of the elongated space of the insertion portion; and
   an electrical circuit board disposed in the elongated space of the insertion portion at least at a position between the terminal holding portion and the accommodation portion, the electrical circuit board extending in an elongated direction of the elongated space, and the electrical circuit board having a circuit which controls a switching element for electrical protection of at least one of the plurality of battery cells, at least a major portion of the circuit board being located in the insertion portion.

20. A combination of a power tool and a power pack as claimed in claim 19, wherein the circuit controls the switching element so as to turn ON/OFF a current path connected to the motor in accordance with a condition of a current for the motor.

21. A combination of a power tool and a power pack as claimed in claim 19, wherein the switching element includes at least one FET.

22. A combination of a power tool and a power pack as claimed in claim 21, wherein the switching element includes two FET connected in parallel.

23. A combination of a power tool and a power pack as claimed in claim 21, further comprising a heat sink which radiates heat generated by the at least one FET.

24. A combination of a power tool and a power pack as claimed in claim 19, wherein the circuit of the circuit board which controls a switching element for electrical protection includes two FET switches connected in parallel and positioned at an air flow passage of at least the major portion of the circuit board which is located in the insertion portion.

25. A combination of a power tool and a power pack as claimed in claim 19, wherein the insertion portion extends in a longitudinal direction transverse to a direction of extension of the accommodation portion so as to be received along a longitudinal extension direction of the receiving portion of the power tool, at least the major portion of the circuit board which is located in the insertion portion extending in the longitudinal direction of the insertion portion.

26. The combination of a power tool and a power pack as claimed in claim 25, wherein the circuit board is located in the insertion portion so as to be spaced from a housing of the insertion portion to enable air flow around the circuit board.

27. The combination of a power tool and a power pack as claimed in claim 26, wherein the housing of the insertion portion includes vent holes enabling air flow therethrough so as to enable cooling of the circuit of the circuit board.

28. The combination of a power tool and a power pack as claimed in claim 19, wherein the elongated extending direction of the elongated space of the insertion portion is a vertical extending direction, the part of the elongated space which extends in the vertical direction at which the terminal holding portion is accommodated is an upper part thereof, the substantially perpendicular extending direction of each of the plurality of battery cells of the power pack is a horizontally extending direction, the position of the electrical circuit board between the terminal holding portion and the accommodation portion is a position below the terminal holding portion so that the electrical circuit board extends in the vertical extending direction of the elongated space, and wherein the terminology of (a) vertical, (b) upper, (c) horizontally, and (d) below are utilized based upon an orientation of the power tool in which the power tool is located above the power pack when the power pack is assembled into the power tool.

29. The combination of a power tool and a power pack as claimed in claim 19, wherein the terminal holding portion is supported by the circuit board.

30. A power pack to be assembled into a power tool provided with a portion having an internal space for receiving a part of the power pack having a plurality of battery cells so as to supply electrical power from the power pack to the power tool, the power pack comprising:
   an insertion portion insertable into the internal space, the insertion portion delimiting an elongated space extending in an elongated direction, wherein the insertion portion does not accommodate a battery cell therein;
   a terminal holding portion accommodated in an upper portion of the insertion portion;
   an accommodation portion having a bottom surface and side walls connected to the insertion portion and disposed outside of the power tool when the insertion portion is inserted into the internal space, the accommodating portion having the plurality of battery cells comprising rechargeable lithium ion battery cells accommodated therein for supplying the electrical power to the power tool, each of the plurality of battery cells having a positive terminal and a negative terminal and a longitudinal axis, wherein the plurality of battery cells of the power pack are accommodated into the accommodation portion so that none of the plurality of battery cells of the power pack is accommodated in the insertion portion, each of the plurality of battery cells of the power pack having the longitudinal axis thereof oriented substantially parallel to the bottom surface of the accommodation portion and in a substantially perpendicular extending direction at least with respect to the elongated extending direction of the elongated space of the insertion portion; and an electrical circuit board disposed in the insertion portion and extending between the plurality of battery cells and the terminal holding portion, the electrical circuit board having a circuit which controls a switching element for electrical protection of at least one of the plurality of battery cells, the circuit board being located in the insertion portion;

wherein the term of upper is utilized based upon an orientation of the power tool in which the power tool is located above the power pack when the power pack is assembled into the power tool.

31. A combination of a power tool and a power pack comprising:

the power tool having a motor and a receiving portion;

the power pack having a plurality of battery cells being assembled into the receiving portion so as to supply electrical power from the power pack to the motor;

the power pack comprising:

an insertion portion insertable into the receiving portion, the insertion portion delimiting an elongated space extending in an elongated direction, wherein the insertion portion does not accommodate a battery cell therein;

a terminal holding portion accommodated in an upper portion of the insertion portion;

an accommodation portion having a bottom surface and side walls connected to the insertion portion and disposed outside of the power tool when the insertion portion is inserted into the receiving portion;

the accommodating portion having the plurality of battery cells comprising rechargeable lithium ion battery cells of the power pack accommodated therein for supplying the electrical power to the power tool so that none of the plurality of battery cells of the power pack is accommodated in the insertion portion, each of the plurality of battery cells having a positive terminal and a negative terminal and a longitudinal axis, each of the plurality of battery cells of the power pack having the longitudinal axis thereof oriented substantially parallel to the bottom surface of the accommodating portion and in a substantially perpendicular extending direction at least with respect to the elongated extending direction of the elongated space of the insertion portion; and an electrical circuit board disposed in the insertion portion and extending between the plurality of battery cells and the terminal holding portion, the electrical circuit board having a circuit which controls switching element for electrical protection of at least one of the plurality of battery cells, the circuit board being located in the insertion portion;

wherein the term of upper is utilized based upon an orientation of the power tool in which the power tool is located above the power pack when the power pack is assembled into the power tool.

32. A power pack comprising:

a housing including an upper portion extending in a first direction so as to delimit an elongated space extending in an elongated direction and a lower portion, and an accommodating portion connected to the lower portion, the accommodating portion having a bottom surface and side walls, and having a width extending in a second direction which is transverse to the first direction and which is greater than a width extending in the second direction of the upper portion, wherein the upper portion does not accommodate a battery cell therein;

a plurality of battery cells of the power pack accommodated in the accommodating portion of the housing;

a circuit board extending in the first direction and positioned above the plurality of battery cells of the power pack accommodated in the accommodating portion, the circuit board being at least partially accommodated in the upper portion of the housing;

a terminal positioned above the circuit board in the first direction;

a switching element fixed to the circuit board; and a heat sink connected to the switching element and extending in the first direction, at least a part of the heat sink being accommodated in the upper portion;

wherein all of the plurality of battery cells of the power pack are accommodated in the accommodating portion so that none of the plurality of battery cells of the power pack is accommodated in the upper portion of the housing, each of the plurality of battery cells having a positive terminal and a negative terminal and a longitudinal axis; and wherein the plurality of battery cells of the power pack include a first lithium ion battery cell having the longitudinal axis thereof extending in the second direction substantially in parallel to the bottom surface of the accommodating portion and substantially perpendicularly to the extending first direction of the circuit board, a second lithium ion battery cell having the longitudinal axis thereof extending in the second direction substantially in parallel to the bottom surface of the accommodating portion and substantially perpendicularly to the extending first direction of the circuit board, and a connection piece connecting the first lithium ion battery cell to the second lithium ion battery cell.

33. The power pack as claimed in claim 32, further comprising an operation segment provided at the housing, the operation segment and the circuit board having a partial overlapping relationship with each other when viewed in the second direction.

34. The power pack as claimed in claim 33, wherein the first lithium ion battery cell and the operation segment have a partial overlapping relationship with each other when viewed in the second direction.

35. The power pack as claimed in claim 32, wherein the switching element and the heat sink are in surface contact with each other.

36. The power pack as claimed in claim 32, wherein the first direction is a vertical direction and the second direction is a horizontal direction.

37. A power tool comprising:

the power pack as claimed in claim 32;

a motor; and a switch provided between the motor and the power pack.

38. The power tool as claimed in claim 37, wherein the power pack further comprises an operation segment provided at the housing, the operation segment and the circuit board having a partial overlapping relationship with each other when viewed in the second direction.

39. The power tool as claimed in claim 38, wherein the first lithium ion battery cell and the operation segment have a partial overlapping relationship with each other when viewed in the second direction.

40. The power tool as claimed in claim 37, wherein the switching element and the heat sink are in surface contact with each other.

41. The power tool as claimed in claim 37, wherein the first direction is a vertical direction and the second direction is a horizontal direction.

\* \* \* \* \*